United States Patent
Liu et al.

(10) Patent No.: US 11,825,188 B2
(45) Date of Patent: Nov. 21, 2023

(54) TERMINAL, PHOTOGRAPHING METHOD, STORAGE MEDIUM, AND ELECTRONIC DEVICE

(71) Applicant: XI'AN ZHONGXING NEW SOFTWARE CO., LTD., Xi'an (CN)

(72) Inventors: Fengpeng Liu, Guangdong (CN); Dongmei Liu, Guangdong (CN)

(73) Assignee: XI'AN ZHONGXING NEW SOFTWARE CO., LTD., Xi'an (CN)

( * ) Notice: Subject to any disclaimer, the term of this patent is extended or adjusted under 35 U.S.C. 154(b) by 0 days.

(21) Appl. No.: 17/611,173

(22) PCT Filed: Oct. 26, 2020

(86) PCT No.: PCT/CN2020/123732
§ 371 (c)(1),
(2) Date: Nov. 14, 2021

(87) PCT Pub. No.: WO2021/078302
PCT Pub. Date: Apr. 29, 2021

(65) Prior Publication Data
US 2022/0217282 A1    Jul. 7, 2022

(30) Foreign Application Priority Data
Oct. 24, 2019    (CN) .......................... 201911015379.2

(51) Int. Cl.
*H04N 23/63*    (2023.01)
*H04N 5/265*    (2006.01)
(Continued)

(52) U.S. Cl.
CPC .......... *H04N 23/632* (2023.01); *H04N 5/265* (2013.01); *H04N 23/51* (2023.01); *H04N 23/695* (2023.01); *H04M 1/0264* (2013.01)

(58) Field of Classification Search
CPC .......... H04M 1/0264; H04M 2250/20; H04M 2250/52; H04N 5/2252; H04N 5/2257;
(Continued)

(56) References Cited

U.S. PATENT DOCUMENTS 10,462,364 B2 * 10/2019 Russi-Vigoya ........ H04N 23/58
2011/0134208 A1 * 6/2011 Kuraoka .............. H04N 1/3876
348/36
(Continued)

FOREIGN PATENT DOCUMENTS

| CN | 109246263 A | 1/2019 |
| CN | 110324440 A | 10/2019 |

(Continued)

OTHER PUBLICATIONS

International search report of PCT Patent Application No. PCT/CN2020/123732 dated Dec. 23, 2020.
(Continued)

*Primary Examiner* — Amy R Hsu

(57) ABSTRACT

The present disclosure provides a terminal, a photographing method, a storage medium, and an electronic device. The terminal comprises a housing, a display panel, and a camera, wherein the camera is provided inside the terminal, and is located behind a gap formed by the display panel and the housing. A driving assembly is provided inside the terminal, and is connected to the camera, for driving the camera to rotate.

15 Claims, 11 Drawing Sheets

(51) Int. Cl.
*H04N 23/51*     (2023.01)
*H04N 23/695*    (2023.01)
*H04M 1/02*      (2006.01)

(58) Field of Classification Search
CPC ............ H04N 5/2259; H04N 5/23238; H04N 5/232935; H04N 5/23299; H04N 5/2624; H04N 5/265
See application file for complete search history.

(56)  References Cited

U.S. PATENT DOCUMENTS

| | | | |
|---|---|---|---|
| 2018/0041692 A1* | 2/2018 | Qin ................... | H04N 23/6812 |
| 2019/0058828 A1* | 2/2019 | Russi-Vigoya ........ | H04N 23/58 |
| 2019/0258144 A1* | 8/2019 | Strobert, Jr. ....... | F16M 11/2014 |
| 2019/0260943 A1* | 8/2019 | Strobert, Jr. ....... | F16M 11/2014 |
| 2020/0045235 A1* | 2/2020 | Ono .................... | B64C 39/024 |
| 2020/0244854 A1* | 7/2020 | Lee ..................... | H04N 23/45 |
| 2020/0244878 A1* | 7/2020 | Yang ................... | H04N 23/45 |

FOREIGN PATENT DOCUMENTS

| | | | |
|---|---|---|---|
| WO | 2016171797 A1 | 10/2016 | |
| WO | 2018080455 A1 | 5/2018 | |

OTHER PUBLICATIONS

Search report of counterpart European Patent Application No. 20879708.4 dated Dec. 19, 2022.

\* cited by examiner

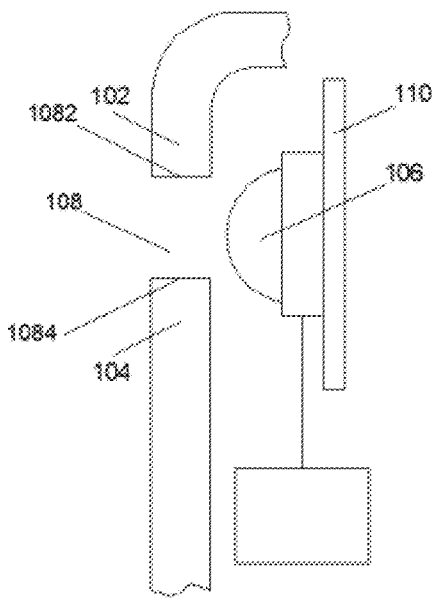

Fig. 4

```
┌─────────────────────────────────────────────┐
│ Drive the camera to rotate to a first edge  │── S202
│ of the gap and perform view-finding on a    │
│ first photographing area through the gap    │
└─────────────────────────────────────────────┘
                      │
┌─────────────────────────────────────────────┐
│ Drive the camera to rotate to a second edge │── S204
│ of the gap opposite the first edge and      │
│ perform view-finding on a second            │
│ photographing area through the gap          │
└─────────────────────────────────────────────┘
                      │
┌─────────────────────────────────────────────┐
│ Splice an image of view-finding on the      │── S206
│ first photographing area and an image of    │
│ view-finding on the second photographing    │
│ area to form a photographed view-finding    │
│ image                                       │
└─────────────────────────────────────────────┘
```

Fig. 5

TERMINAL, PHOTOGRAPHING METHOD, STORAGE MEDIUM, AND ELECTRONIC DEVICE

CROSS-REFERENCE TO RELATED APPLICATIONS

This application is a United States National Stage Application filed under 35 U.S.C. § 371 of PCT Patent Application Serial No. PCT/CN2020/123732, filed Oct. 26, 2020, which claims the priority of Chinese Patent Application CN 201911015379.2, entitled "Terminal, Photographing Method, Storage Medium, and Electronic Device" and filed on Oct. 24, 2019, the entirety of which is incorporated herein by reference.

FIELD OF THE INVENTION

The present disclosure relates to the field of image processing, and in particular, to a terminal, a photographing method, a storage medium, and an electronic device.

BACKGROUND OF THE INVENTION

With development of panel technologies and proliferation of user demands, a proportion of a display area of a terminal device in an area of the terminal device becomes greater. That is, a screen-to-body ratio of the display area (i.e., a screen) in the terminal device gradually increases. At present, one of bottlenecks that restrict further improvement of the screen-to-body ratio in the terminal device is disposing of a front camera in the terminal device. Since common applications in current terminals, such as video communication and selfie-taking, are implemented all by front cameras, it is not possible to exclude the front cameras.

In order to ensure a display effect of the camera, the camera is often arranged abreast of the screen in the terminal device in relevant technologies. That is, the camera and the screen are integrated abreast at a front end of the terminal device. Under said arrangement of the camera, the screen-to-body ratio of the terminal device can only be improved by increasing an area of the screen in a region where the camera is not provided, and arrangement of the screen cannot be performed in a region where the camera is provided. Therefore, in relevant technologies, the screen-to-body ratio of the terminal device cannot be further improved.

SUMMARY OF THE INVENTION

Embodiments of the present disclosure provide a terminal, a photographing method based on the terminal, a storage medium, and an electronic device.

According to an embodiment of the present disclosure, provided is a terminal including: a housing, a display panel, and a camera. The camera is provided inside the terminal, and is located behind a gap formed by the display panel and the housing. A driving assembly is provided inside the terminal, and is coupled to the camera for driving the camera to rotate.

According to another embodiment of the present disclosure, provided is a photographing method, which is applied to the terminal. The terminal includes: a housing, a display panel, a camera, and a driving assembly. The camera is provided inside the terminal, and is located behind a gap formed by the display panel and the housing. The driving assembly is coupled to the camera for driving the camera to rotate. The method includes steps of:

driving the camera to rotate to a first edge of the gap and perform view-finding on a first photographing area through the gap;

driving the camera to rotate to a second edge of the gap opposite the first edge, and perform view-finding on a second photographing area through the gap; and splicing an image of view-finding on the first photographing area and an image of view-finding on the second photographing area to form a photographed view-finding image.

According to yet another embodiment of the present disclosure, provided is a computer-readable storage medium configured to store a computer program which, when executed by a processor, causes the processor to perform steps of anyone of the above method embodiments.

According to still another embodiment of the present disclosure, provided is an electronic device including a memory and a processor. The memory stores a computer program therein. The processor is configured to execute the computer program so as to perform steps of anyone of the above method embodiments.

BRIEF DESCRIPTION OF THE DRAWINGS

The accompanying drawings illustrated herein are used to provide further understanding of the present disclosure, and constitute part of the present disclosure. Exemplary embodiments of the present disclosure and the description thereof are used to explain the present disclosure, and do not constitute improper limitation on the present disclosure. In the accompanying drawings:

FIG. 4 is a schematic diagram showing a photographing position of a camera provided according to an embodiment of the present disclosure;

FIG. 5 is a flowchart of a photographing method provided according to an embodiment of the present disclosure;

DETAILED DESCRIPTION OF THE EMBODIMENTS

The present disclosure will be described below with reference to the accompanying drawings in conjunction with embodiments. It should be noted that, as long as there is no conflict, embodiments of the present disclosure and features in the embodiments may be combined with each other.

It should be noted that, terms such as "first" and "second" used in the description, claims, and the accompanying drawings of the present disclosure are used to distinguish similar objects, and are not necessarily used to describe a specific order or sequence.

Embodiment 1

Figure 1:
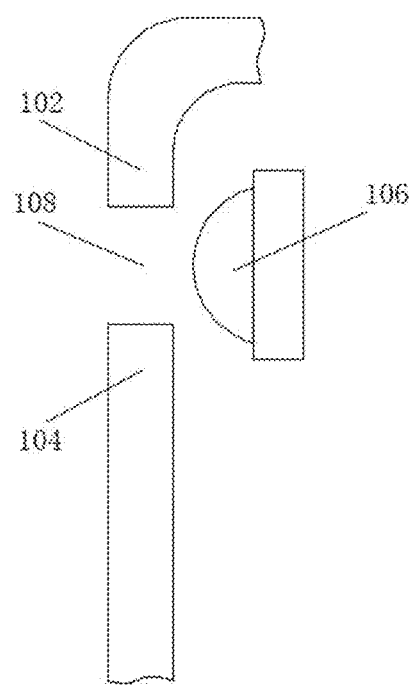
FIG. 1 is a schematic diagram showing a structure of a terminal provided according to an embodiment of the present disclosure.

The present disclosure provides a terminal. FIG. 1 schematically shows a structure of a terminal provided according to an embodiment of the present disclosure. As shown in FIG. 1, the terminal includes: a housing 102, a display panel 104, and a camera 106. The camera 106 is provided inside the terminal, and is located behind a gap 108 formed by the display panel 104 and the housing 102.

In the above embodiment, by providing the camera behind the gap formed by the display panel and the housing of the terminal, a screen-to-body ratio of the terminal is improved. Therefore, the terminal in the present embodiment can solve the problem in relevant technologies that a screen-to-body ratio of a terminal device cannot be improved due to an impact from arrangement of a front camera.

It should be further noted that, the terminal in the present embodiment includes, but is not limited to, a cellphone, a tablet computer, a PC, a wearable device and so on. Any terminal that has a front camera shooting function and includes a housing and a display panel may be used as the terminal of the present embodiment. The present disclosure does not make any limitation on a specific type of the terminal.

In said terminal, the housing is a housing which forms encasing to the terminal. Generally, the housing includes an upper end surface, a lower end surface, a side end surface, a front end surface, and a back surface. The housing is provided at the front end surface with an opening for mounting the display panel, so as to install the display panel. When the display panel is mounted in said opening, the display panel and the housing form an entirety of the terminal. It should be noted that, said housing may be a one-piece component, and may also be formed by connection of multiple components (for example, a back cover and a side periphery of a cellphone). The present disclosure does not make any limitation on a structure of the housing.

In the process of assembling the display panel and the housing, since the display panel and the housing are separate components, it is inevitable that a clearance exists therebetween. This clearance forms the gap mentioned in the above embodiment. The gap may be a gap that is naturally formed between the display panel and the housing in the assembling process, and may also be a gap that is further provided artificially on the basis of the gap formed in the above assembling process. It should be noted that, taking a cellphone for example, the display panel is usually provided with a glass panel or a capacitive touch assembly outside the display panel. In the present embodiment, the gap may be provided below the glass panel, and a groove may be provided in an area where the glass panel corresponds to the gap.

The camera mentioned above refers to the front camera that is located at a front end of the terminal. Description that the camera is provided inside the terminal and is located behind the gap formed between the display panel and the housing specifically refers to that the front camera is provided inside the terminal, i.e., between the housing and the display panel. Since the gap in the above embodiment is formed between the housing and the display panel, when the camera is located inside the terminal, the camera and the gap are distributed, respectively, at a front end surface of the terminal and inside the terminal, so as to further form a staggered distribution structure. In order to enable the camera to make a response in time as much as possible during working, the camera and the gap should be located at height positions that face each other (with reference to a position when the terminal in use is placed vertically), or the height positions at which the camera and the gap are located should be within a reasonable difference range. In addition to the camera in the present embodiment, a control component, a storage component, a power supply component, a heat dissipation component and so on are further provided in the area between the housing and the display panel. The present disclosure does not make any limitation on types and arrangement manners of the components inside the terminal other than the camera.

Since the camera is provided inside the terminal in the present embodiment, only the gap formed between the display panel and the housing is retained at the front end surface of the terminal, i.e., an end surface where the display panel of the terminal is located. Compared with a technical solution in relevant technologies in which the camera is directly disposed at the front end of the terminal (i.e., the cameral and the display panel are abreast), a width of the gap in the present embodiment is significantly less than a physical width of the camera in this direction. Therefore, it is no longer necessary to leave a space that is equal to a corresponding area of the camera on the end surface of the terminal, so that the screen-to-body ratio of the front end of the terminal can be further improved.

In an alternative embodiment, the terminal further includes:

a driving assembly 110, which is provided inside the terminal, and is coupled to the camera for driving the camera to rotate.

It should be further noted that, said driving assembly is configured to control the camera to rotate, so as to enable varied positions of the camera relative to the gap for implementing photographing at different angles relative to edges of the gap. According to the principles of optics, images acquired in a photographing process in which the camera is located at different angles relative to the edges of the gap are different. That is, in a process of controlling the camera to rotate by the driving assembly, the camera is enabled to acquire images at different angles. After performing relevant processing on these images, a complete image may be obtained for operation of a user. Therefore, the terminal in the present embodiment can also ensure a good photographing effect while improving the screen-to-body ratio of the terminal.

In order to realize rotation of a photographing assembly, said driving assembly includes at least a connection part for coupling the camera and a driving part for driving the connection part and the photographing assembly to move. The present disclosure does not make any limitation on specific construction of the driving assembly, and any driving assembly that can implement the above function falls into the protection scope of the present disclosure.

Said driving part further includes a controlling part, which is configured to control the driving part to drive the connection part to rotate, so as to control rotation of the camera. The controlling part may adopt a controlling unit which is provided and integrated independently of the driving part, for example, a memory that stores controlling instructions, and a controller that is configured to send controlling instructions. The controlling part may also be combined with a controlling module of the terminal itself. That is, controlling instructions for the driving assembly and the camera are integrated into a CPU of a related terminal device. In either of the above manners, a direct or indirect electrical connection is formed between the controlling part and the driving part, so that the driving part, the connection part, and the camera may move correspondingly in response to controlling instructions generated by the controlling part. A specific connection manner between the controlling part and the driving part may be a physical connection or a wireless communication connection, and the present disclosure does not make any limitation on this matter.

In an alternative embodiment, the driving assembly 110 includes:

a rotation base plate 1102, which is provided near the gap 108; and a driving component 1104, which is coupled to the camera 106 for driving the camera 106 to rotate along the rotation base plate 1102.

Figure 2:
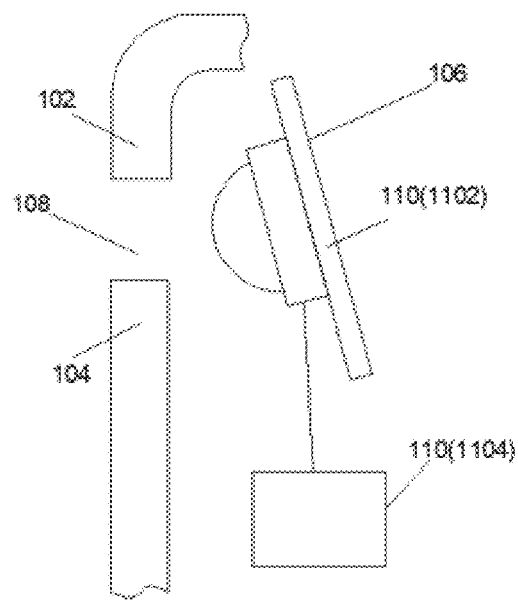
FIG. 2 is a schematic view (I) showing a rotation position of a camera provided according to an embodiment of the present disclosure.
Figure 3:
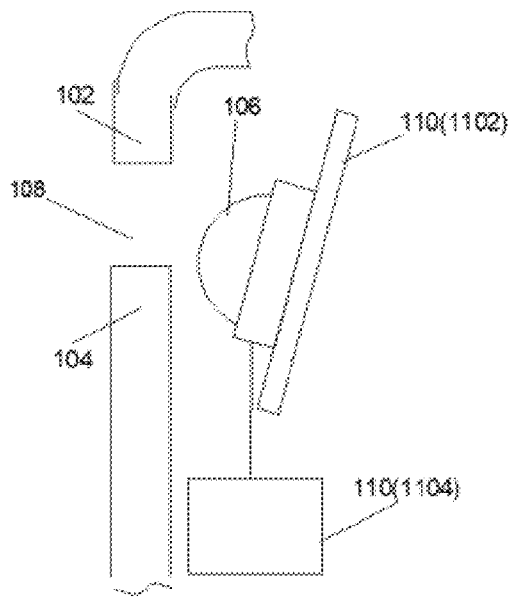
FIG. 3 is a schematic view (II) showing a rotation position of the camera provided according to an embodiment of the present disclosure.

It should be further noted that, said rotation base plate may be used as the connection part in the above embodiment, and the driving component may be used as the driving part in the above embodiment. FIG. 2 is schematic view (I) of a rotation position of the camera provided according to the present embodiment, and FIG. 3 is a schematic view (II) of a rotation position of the camera provided according to the present embodiment. As shown in FIGS. 2 and 3, the camera is controlled by the driving component in the driving assembly to rotate, along the rotation base plate, to a position corresponding to an upper edge of the gap and a position corresponding to a lower edge of the gap, respectively, so as to perform photographing.

Embodiment 2

A photographing method is provided in the present embodiment, which is applied to the terminal in the above embodiment. FIG. 4 schematically shows a photographing position of the camera provided according to the present embodiment. As shown in FIG. 4, the terminal includes: a housing 102, a display panel 104, a camera 106, and a driving assembly 110. The camera 106 is provided inside the terminal, and is located behind a gap 108 formed by the display panel 104 and the housing 102. The driving assembly 110 is coupled to the camera 106 for driving the camera 106 to rotate along the gap 108. Besides, positions where the camera performs photographing include a first edge 1082 and a second edge 1084 of the gap 108. FIG. 5 shows a flowchart of the photographing method provided according to the present embodiment. As shown in FIG. 5, the method in the present embodiment includes steps S202 to S206.

S202, the camera is driven to rotate to the first edge of the gap and perform view-finding on a first photographing area through the gap;

S204, the camera is driven to rotate to the second edge of the gap opposite the first edge and perform view-finding on a second photographing area through the gap; and S206, an image of view-finding on the first photographing area and an image of view-finding on the second photographing area are spliced together to form a photographed view-finding image.

In the above embodiment, the camera is provided behind the gap formed by the display panel and the housing of the terminal. In the above photographing method, by driving the camera to move in a direction perpendicular to the gap and perform view-finding and photographing on different photographing areas, images of view-finding on different photographing areas are acquired; and by splicing these images of view-finding on different photographing areas, a photographed view-finding image is formed, so that the photographing effect of a front camera can also be ensured while improving the screen-to-body ratio of the terminal. Therefore, the photographing method in the present embodiment can solve the problem in relevant technologies that the screen-to-body ratio of a terminal device cannot be improved due to an impact from arrangement of the front camera.

In an alternative embodiment, the steps S202 and S204 may be implemented in a switched order, i.e., implementing the step S204 prior to the step S202.

In an alternative embodiment, the steps S202 to S206 may be carried out by a controlling assembly, which may be integrated into a controlling module of the terminal. That is, movement of the camera and photographing in the steps S202 and S204 and the splicing processing on the images in the step S206 are realized by a CPU of a terminal device. The controlling assembly may also control the movement of the camera and photographing in the steps S202 and S204 by a separate first controlling component, and perform the splicing processing on the images in the step S206 by a separate second controlling component. The present disclosure does not make any limitation on the specific construction of the controlling assembly.

Figure 6:
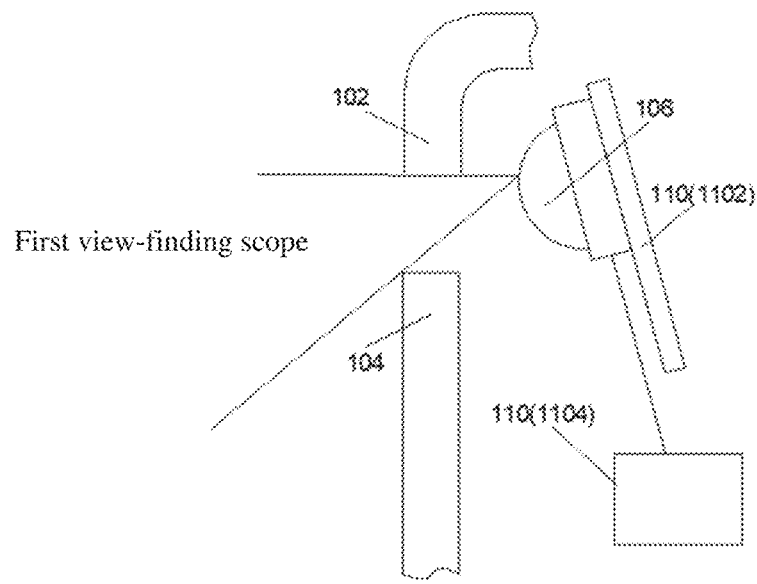
FIG. 6 is a schematic diagram showing a first photographing area provided according to an embodiment of the present disclosure.
Figure 7:
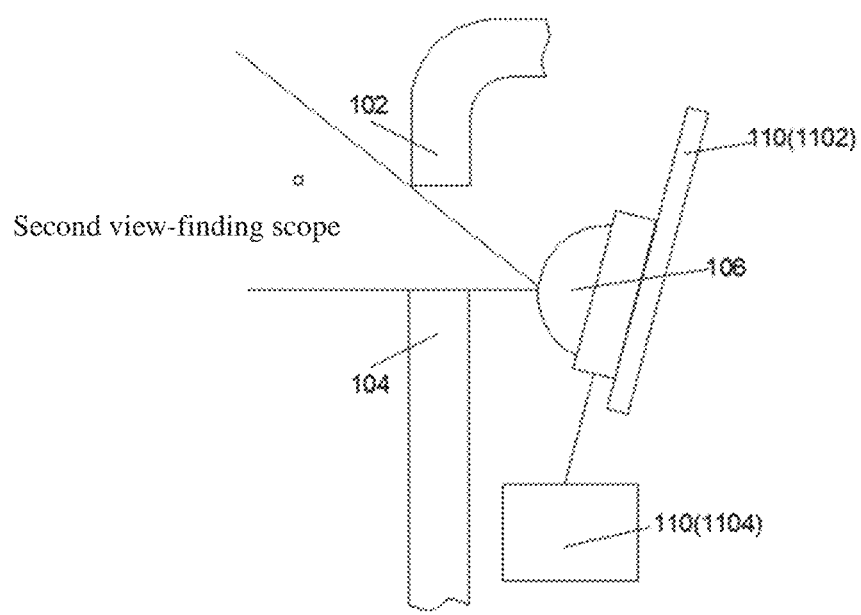
FIG. 7 is a schematic diagram showing a second photographing area provided according to an embodiment of the present disclosure.

As shown in FIG. 4, said first edge of the gap in the step S202 indicates an edge position in the gap corresponding to the side of the housing. When the terminal is placed vertically in a common using state, the first edge is an upper edge of the gap. Said first photographing area indicates a corresponding photographed image taken when the camera is located at a first edge position relative to the gap. FIG. 6 schematically shows the first photographing area provided according to the present embodiment. As shown in FIG. 6, when the camera is located at a position corresponding to the first edge of the gap, according to the principles of optics, a photographing scope of the camera corresponds to a lower half area relative to the gap. That is, the first photographing area in the present embodiment is said lower half area. It should be further noted that, the camera moving to the first edge of the gap indicates that the camera moves to a position which is flush with a height of the first edge of the gap, rather than that the camera contacts with the first edge. Said second edge of the gap in the step S204 refers to an edge position in the gap corresponding to the side of the display panel. When the terminal is placed vertically in the common using state, the second edge is a lower edge of the gap. Said second photographing area indicates a corresponding photographed image taken when the camera is located at a second edge position relative to the gap. FIG. 7 schematically shows the second photographing area provided according to the present embodiment. As shown in FIG. 7, when the camera is located at a position corresponding to the second edge of the gap, according to the principles of optics, a photographing scope of the camera corresponds to an upper half area relative to the gap. That is, the second photographing area in the present embodiment is said upper half area. It should be further noted that, the camera moving to the second edge of the gap indicates that the camera moves to a position which is flush with a height of the second edge of the gap, rather than that the camera contacts with the second edge.

Photographing a portrait is taken as an example. When the user needs to find a view for his/her own portrait, a lower half body of the portrait may be photographed when the camera is located at the first edge of the gap, and an upper half body of the portrait may be photographed when the camera is located at the second edge of the gap. A complete portrait image may be obtained by performing splicing or combining on images of the upper half body and the lower half body.

In an alternative embodiment, in the step S202, before the camera is driven to rotate to the first edge of the gap, the method further includes that:
 position information of the first edge and the second edge of the gap are collected when the camera is initialized; and
 coordinate axes are established according to the position information collected, herein, a direction in which the gap extends is set as an X axis, a direction perpendicular to the gap is set as a Y axis, a direction of view-finding is set as a Z axis.

It should be further noted that, a time instant when the camera is initialized indicates a time instant when the terminal starts to work, which usually refers to two circumstances: the terminal enters into a power-on state from a power-off state, or the terminal switches to a working state from a sleep state. During initialization of the camera, the controlling assembly may instruct the camera to acquire a position of the first edge and a position of the second edge. Specifically, an image containing the first edge and the second edge of the gap therein may be acquired by the camera, and positions corresponding to the first edge and the second edge of the photographed gap are acquired by performing processing or recognition on the image.

Further, under the premise that the camera acquires the first edge and the second edge of the gap, a direction in which the first edge or the second edge extends may be used as the direction in which the gas extends, i.e., the X axis; a direction in which the first edge faces the second edge is used as the direction perpendicular to the gap, i.e., the Y axis; and a direction in which the camera takes photograph and finds a view is used as the Z axis.

In an alternative embodiment, after the coordinate axes are established according to the position information collected, the method further includes that:
 a centerline position between the first edge and the second edge is calculated according to the coordinate axes established; and
 the camera is driven to move to the centerline position along the Y axis and perform focusing.

Figure 8:
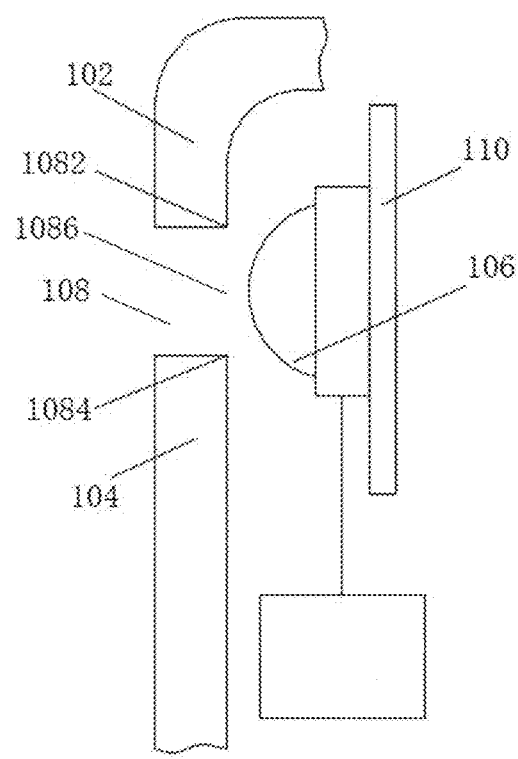
FIG. 8 is a schematic diagram showing a centerline position provided according to an embodiment of the present disclosure.

It should be noted that, the centerline position between the first edge and the second edge specifically indicates a central position of the gap. FIG. 8 schematically shows the centerline position provided according to the present embodiment. As shown in FIG. 8, a central position between the first edge 1082 and the second edge 1084 is a centerline 1086. Said centerline position may be used to perform focusing of the camera. After focusing of the camera is completed, initialization of the camera is completed then. In addition, said centerline position may also be used to restore the camera after the steps S202 to S206 of the photographing method are completed.

In an alternative embodiment, the step S206 of splicing the image of view-finding on the first photographing area and the image of view-finding on the second photographing area to form a photographed view-finding image includes that:
 feature points in the image of view-finding on the first photographing area and the image of view-finding on the second photographing area are extracted, respectively;
 the image of view-finding on the first photographing area and the image of view-finding on the second photographing area are spliced according to the feature points extracted so as to form the photographed view-finding image; and
 a scale for the photographed view-finding image is selected according to a preset display scale.

It should be further noted that, the feature points in the image of view-finding on the first photographing area and the image of view-finding on the second photographing area usually refer to basic pixels that form the images of view-finding, and the completed photographed view-finding image may be obtained by splicing the basic pixels. In the process of splicing the feature points in the image of view-finding on the first photographing area and the image of view-finding on the second photographing area, feature points that are coincide with each other in the image of view-finding on the first photographing area and the image of view-finding on the second photographing area are used as reference.

Since a ratio of the image of view-finding on the first photographing area or the image of view-finding on the second photographing area to the photographed view-finding image is not 1:2, it is necessary to scale down an obtained image after splicing the image of view-finding on the first photographing area and the image of view-finding on the second photographing area so as to obtain the photographed view-finding image that can be displayed normally in the terminal. It should be noted that said ratio is associated with a width of the gap in the vertical direction in the present embodiment, and the present disclosure does not make any limitation on the specific setting of the ratio.

In an alternative embodiment, in the step S206, after the image of view-finding on the first photographing area and the image of view-finding on the second photographing area are spliced to form the photographed view-finding image, the photographed view-finding image is stored and is used as a photographed image.

It should be further noted that, storing of the photographed view-finding image means that the photographed view-finding image is stored in a storage module of the terminal and displayed to the user by an application such as "album". In addition to said storing operation, the photographing method of the present embodiment may also include displaying the photographed view-finding image in real time in the display panel of the terminal.

In an alternative embodiment, at least a group of operations including view-finding on the first photographing area, view-finding on the second photographing area, and splicing the images of view-finding is completed within one refresh cycle of the camera.

It should be further noted that, said one refresh cycle refers to a refresh cycle of every frame of image in the display panel. That is, in the present embodiment, operations of moving of the camera between the first edge and the second edge of the gap, photographing images of view-finding on the corresponding positions, and splicing the images of view-finding are completed within one refresh cycle. By means of this technical solution, delay generated due to the photographing method in the present embodiment would not occur while the display panel is displaying images. When the photographing method in the present embodiment is used for continuous shooting or for video communication, multiple groups of operations may be completed within one refresh cycle, and an image having the best resolution in the multiple groups of operations is selected and stored.

Based on the description of the above embodiments, those skilled in the art can clearly understand that the method according to the above embodiments may be implemented by means of software plus a general hardware platform, and may also be implemented by means of hardware. However, in most cases, the former is a better implementation manner. Based on such understanding, the technical solution of the present disclosure essentially, or the part of the technical solution of the present disclosure that makes contribution to the existing technologies, may be embodied in the form of a software product. This computer software product is stored in a storage medium (such as a ROM/RAM, a magnetic disk, and an optical disk), and includes several instructions for causing a terminal device (which may be a cellphone, a computer, a server, or a network device) to carry out the method in various embodiments of the present disclosure.

In order to further explain the structure of the terminal for photographing and a working mode thereof, detailed description is provided through a specific embodiment.

Specific Embodiment 1

Figure 9:
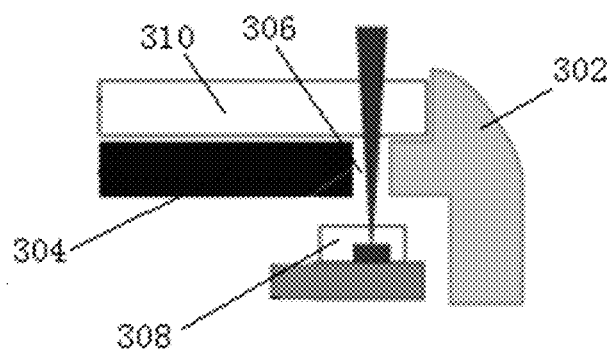
FIG. 9 is a schematic diagram showing a structure of a front camera of a cellphone provided according to a specific embodiment of the present disclosure.

In the present specific embodiment, detailed description is made by using a cellphone as the terminal. In the present specific embodiment, a solution that a front camera and a screen are provided to coincide with each other in a front-rear direction, rather than a solution in relevant technologies that a screen and a front camera are disposed abreast with each other, is adopted. Specifically, in the present specific embodiment, the front camera is provided inside the cellphone, and view-finding by the front camera is realized though a gap between a display panel and a housing of the cellphone. FIG. 9 schematically shows a structure of a front camera of the cellphone provided according to the present specific embodiment. As shown in FIG. 9, a gap 306 is formed between a housing 302 and a display screen 304 of the cellphone. A front camera 308 is provided inside the housing 302 of the cellphone, and faces said gap 306. The front camera 308 is further connected to a sliding device, such as a rotation base plate, inside the housing, and the front camera 308 specifically may slide in a width direction of the gap (i.e., a height direction when the cellphone is placed vertically) along the rotation base plate. The display screen 304 is covered with a glass panel 310 outside the display screen 304.

A width of the gap 306 is notably less than a common width of the front camera 308. Therefore, a significant improvement of the screen-to-body ratio can be realized at a front end of the cellphone.

In the present specific embodiment, steps when the front camera works are as follows.

Figure 10:
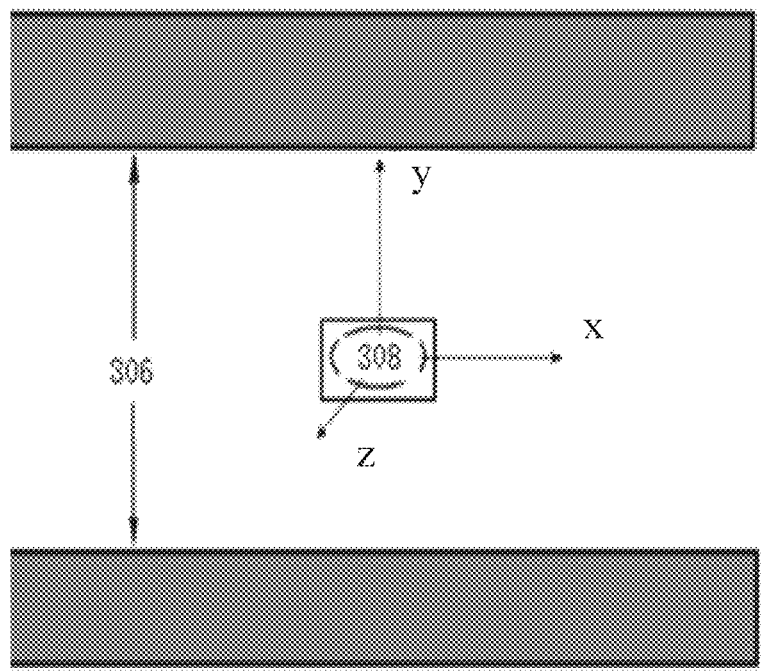
FIG. 10 is a schematic diagram showing a coordinate system for operation of the front camera provided according to a specific embodiment of the present disclosure.

At step S1, the front camera 308, when is activated, collects edges of the gap. Activating of the front camera indicates that the front camera 308 is initialized. This activation may be set to be performed each time after the cellphone is powered on, and may also be set to be performed each time after the cellphone ends a sleep mode. The front camera 308 collecting the edges of the gap may be realized by establishing a coordinate system. FIG. 10 schematically shows a coordinate system for operation of the front camera provided according to the present specific embodiment. As shown in FIG. 10, the coordinate system is established through the following steps S1.2 to S1.3.

At step S1.1, a coordinate system is established. A length direction of the gap 306 is taken as an X axis; a width direction of the gap 306 or a rotation direction of the front camera 308 is taken as a Y axis; and a direction of view-finding by the front camera 308 is taken as a Z axis. Herein, the X axis and the Y axis are perpendicular to each other.

At step S1.2, after the cellphone is turned on, i.e., when the front camera 308 is powered on, the front camera 308 stays still and scans upper edge information and lower edge information corresponding to the upper edge and the lower edge of the gap 306. The upper edge information and the lower edge information specifically refer to height positions where the upper edge and the lower edge are located.

At step S1.3, according to the upper edge information and lower edge information collected, coordinates corresponding to the upper edge information and lower edge information are marked in the coordinate system established in the step S1.1.

Figure 11:
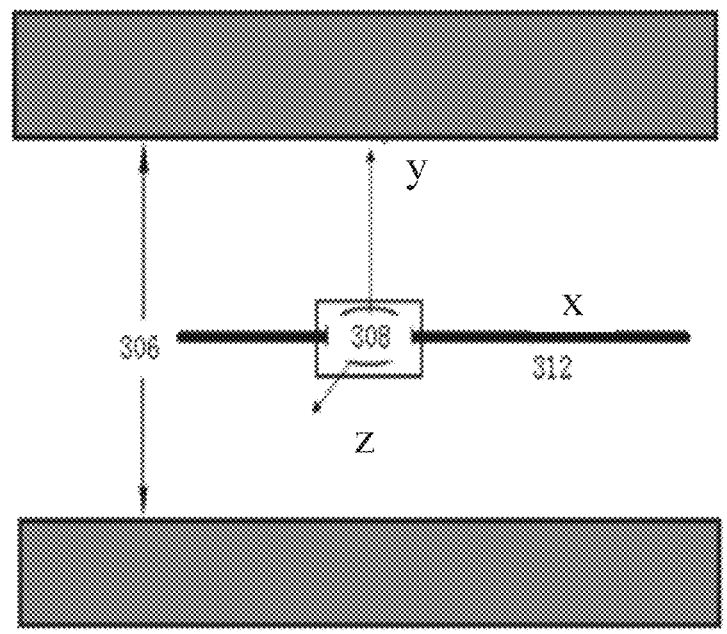
FIG. 11 is a schematic diagram showing a focusing position in the coordinate system for operation of the front camera provided according to a specific embodiment of the present disclosure.

At step S2, according to the coordinates corresponding to the upper edge information and lower edge information of the gap 306 in the coordinate system, coordinates corresponding to a centerline of the gap 306 is calculated. Specifically, a position where the upper edge of the gap and the Y axis intersect is defined as Y1, and a position where the lower edge of the gap and the Y axis intersect is defined as Y2. A midpoint of a line segment Y1-Y2 is defined as a point (0, 0) in an X-Y coordinate plane. An X coordinate axis is established, which is the centerline 312 of the gap. FIG. 11 schematically shows a focusing position in the coordinate system for operation of the front camera provided according to the present specific embodiment. As shown in FIG. 11, the X coordinate axis is established by using a position (0,0) illustrated in FIG. 11 as a focusing position.

After the above setting is completed, the front camera 308 is moved and adjusted along a direction of the Y axis to rotate to the point (0, 0), and the camera focuses on a center of the gap at this time.

When the cellphone activates the front camera each time, the front camera 308 is configured to automatically execute the above process, i.e., enabling the front camera 308 to focus on the coordinate (0, 0). Besides, after the front camera 308 completes working each time, the coordinate (0, 0) is also used as a restoration position for the front camera 308.

Figure 12:
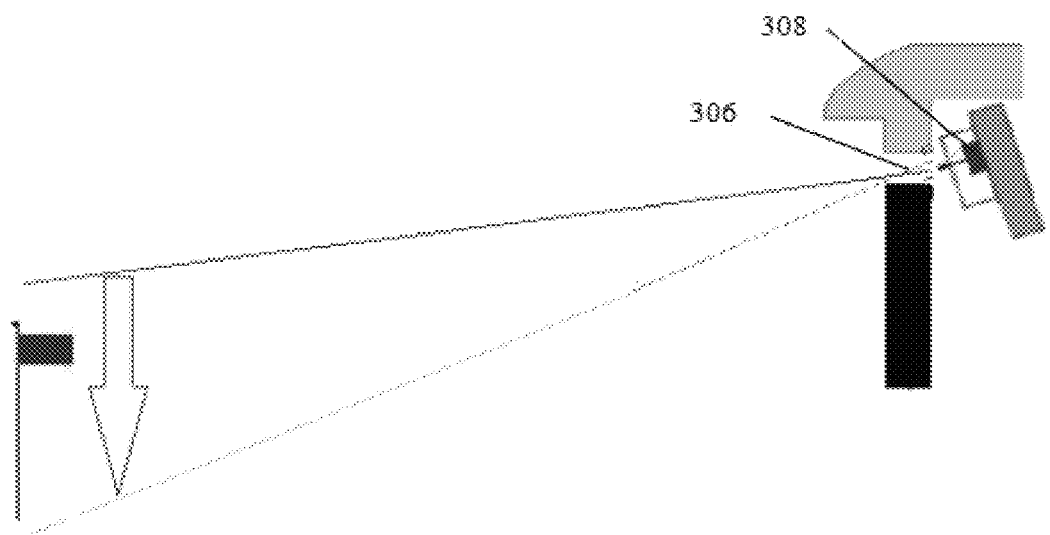
FIG. 12 is a schematic diagram showing operation of the front camera when the front camera is located at a position corresponding to an upper edge of a gap provided according to a specific embodiment of the present disclosure.

At step S3, when the front camera 308 needs to work, firstly, the front camera 308 is controlled to rotate in real time to a coordinate corresponding to the upper edge information. When the front camera 308 is at a position corresponding to the upper edge of the gap, more scenery of the lower half can be collected. Accordingly, after the front camera 308 completes focusing, the front camera 308 needs to rotate to a position of the coordinate corresponding to the upper edge information of the gap to find a view of the lower half. FIG. 12 schematically shows operation of the front camera when the front camera is located at a position corresponding to the upper edge of the gap provided according to the present specific embodiment. As shown in FIG. 12, the front camera completes view-finding on the lower half when the front camera is located at the position corresponding to the upper edge of the gap.

Figure 13:
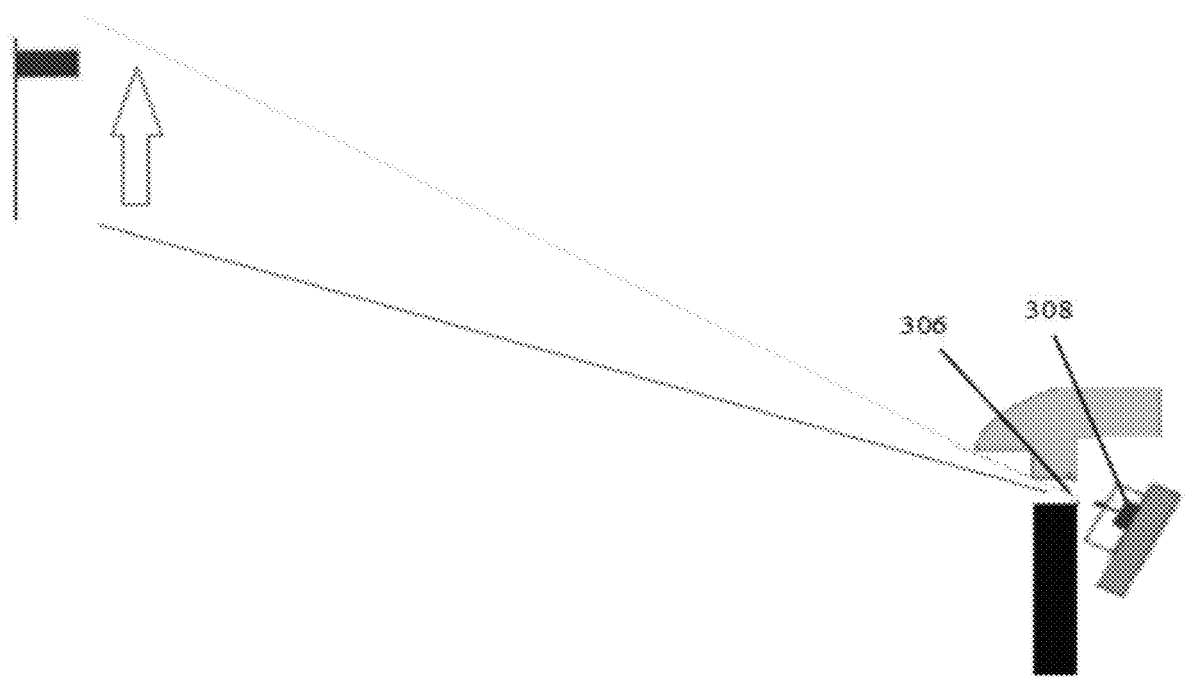
FIG. 13 is a schematic diagram showing operation of the front camera when the front camera is located at a position corresponding to a lower edge of the gap provided according to a specific embodiment of the present disclosure.

At step S4, similar to the step S3, when the front camera 308 rotates to align with a position corresponding to the lower edge of the gap, more scenery of the upper half can be collected. Accordingly, after the front camera 308 completes view-finding on the upper half, the front camera 308 needs to rotate to a position of a coordinate corresponding to the lower edge information to find a view of the upper half. FIG. 13 schematically shows operation of the front camera when the front camera is located at a position corresponding to the lower edge of the gap provided according to the present specific embodiment. As shown in FIG. 13, the front camera completes view-finding on the upper half when the front camera is located at the position corresponding to the lower edge of the gap.

Figure 14:
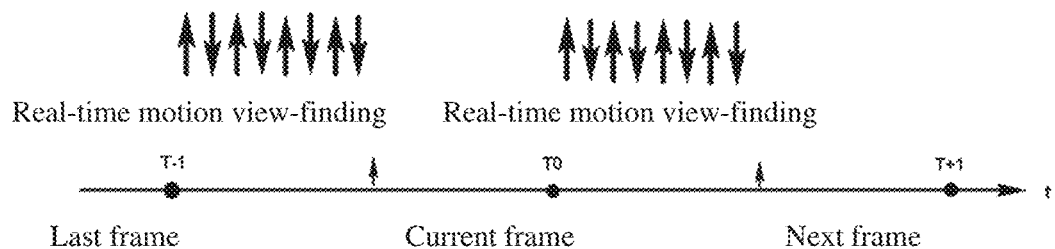
FIG. 14 is a flowchart of acquiring an image by the front camera in a frame period provided according to an embodiment of the present disclosure.

FIG. 14 schematically shows a flowchart of acquiring an image by the front camera in a frame period provided according to the present embodiment. As shown in FIG. 14, an upward arrow in FIG. 14 indicates that the front camera rotates upward to acquire an image of the lower half, and a downward arrow indicates that the front camera rotates downward to acquire an image of the upper half.

At step S5, since the image of the lower half and the image of the upper half acquired in the above steps S3 and S4 are both partial images, it is required to splice the image of the lower half and the image of the upper half in real time so as to obtain a complete image of the scenery. A specific process of splicing the images includes following steps S5.1 to S5.5.

At step S5.1, an image processing chip in the cellphone, such as a CPU or a DSP, extracts and analyzes feature points from a group of two images, i.e., the image of the upper half and the image of the lower half.

At step S5.2, according to the feature points of the two images, the images are spliced with an increased image size.

At step S5.3, a scale is selected for an image obtained by splicing according to a current size scale that is displayed by the cellphone, and the principle of making the selection is to display scenery information of the image at the maximum display scale.

Figure 15:
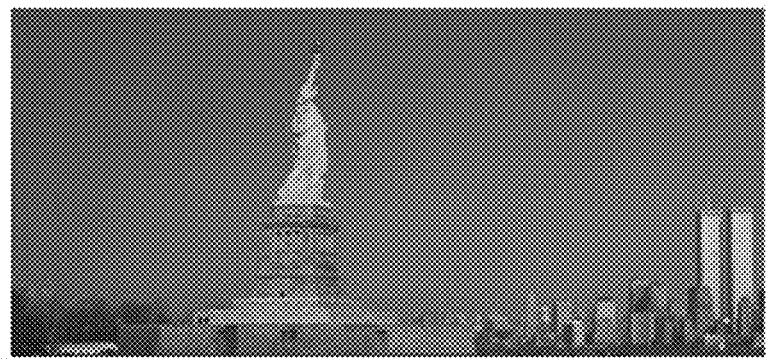
FIG. 15 is a schematic diagram showing an image of an upper half provided according to a specific embodiment of the present disclosure.
Figure 16:
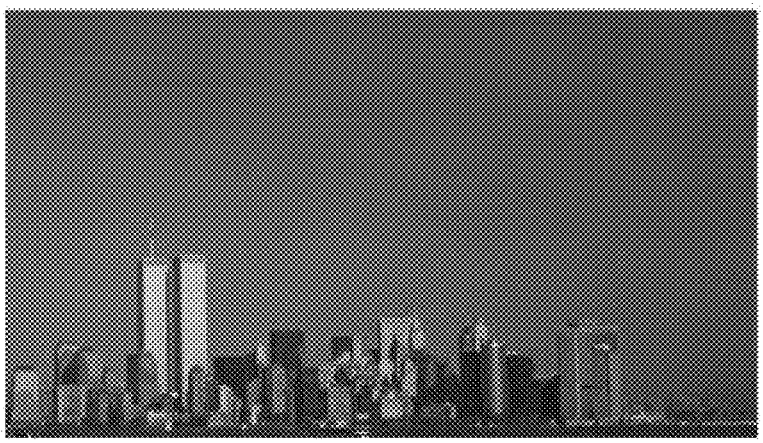
FIG. 16 is a schematic diagram showing an image of a lower half provided according to a specific embodiment of the present disclosure.
Figure 17:
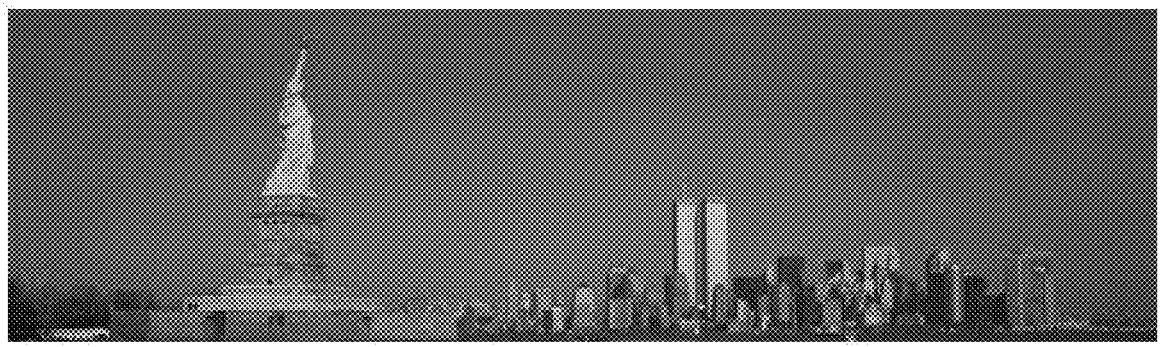
FIG. 17 is a schematic diagram showing a complete image provided according to a specific embodiment of the present disclosure.

At step S5.4, if splicing of multiple groups of images is completed within one frame refresh cycle, an image having a higher resolution is chosen as an image to be displayed. FIG. 15 schematically shows an image of the upper half provided according to the present embodiment. FIG. 16 schematically shows an image of the lower half provided according to the present embodiment. FIG. 17 schematically shows a complete image provided according to the present embodiment. It should be noted that in order to illustrate acquiring of images in a clearer way in the present specific embodiment, FIGS. 15 and 16 are both images photographed when the cellphone is in a horizontal state, and thus images acquired by the front camera in the photographing process are respectively an image of view-finding on a left side of the gap and an image of view-finding on a right side of the gap in terms of an actual orientation. By splicing the images in FIGS. 15 and 16, the image shown in FIG. 17 is obtained.

At step S5.5, the image that has been processed is displayed in the cellphone.

The above steps S1 to S5 are required to be completed within one frame refresh cycle. At this time, the image displayed in the terminal device is a clear image that is subject to splicing and has obvious features.

Figure 18:
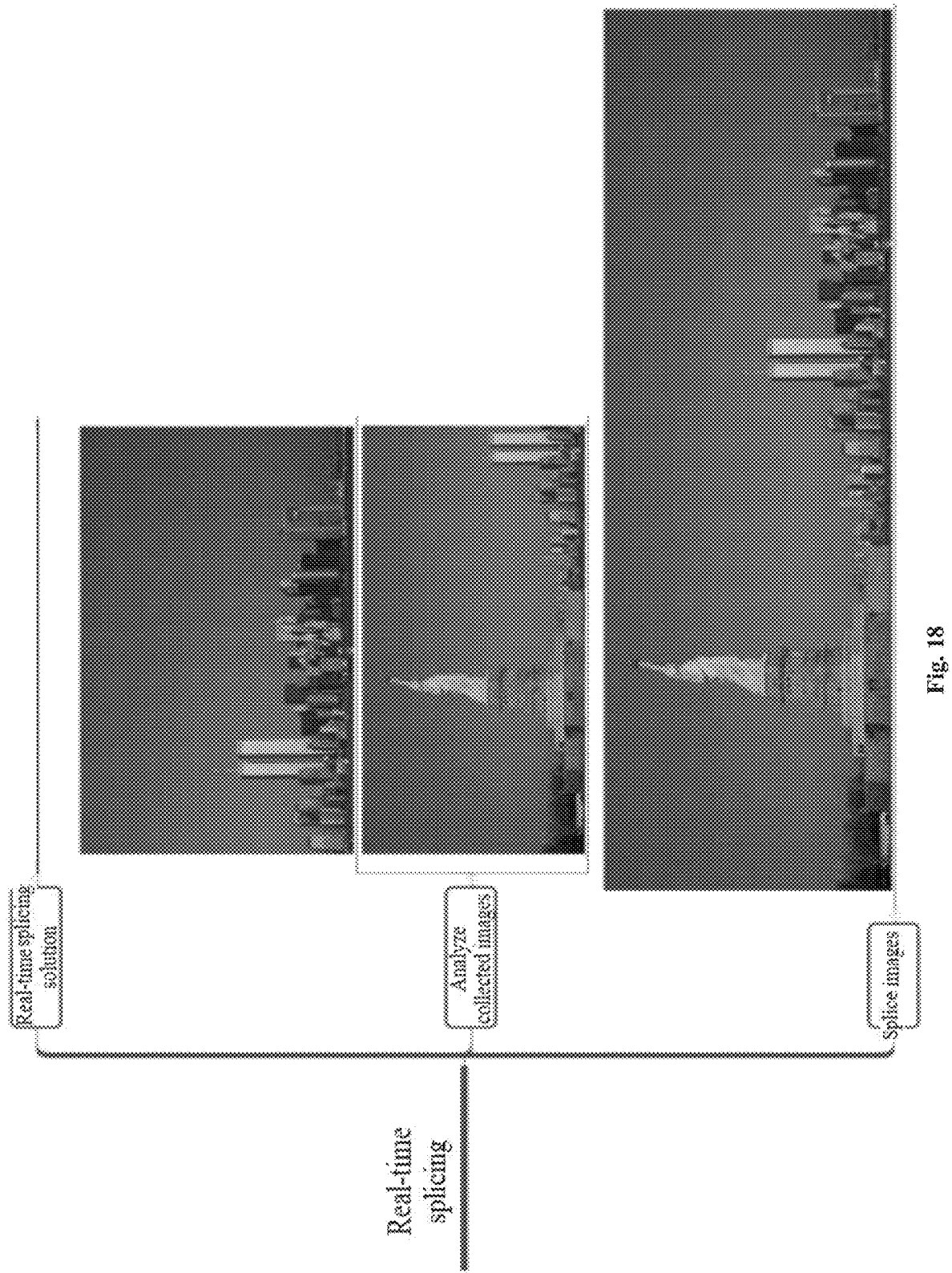
FIG. 18 is a schematic diagram of image processing provided according to a specific embodiment of the present disclosure.

To sum up, in the present specific embodiment, splicing of images in real time performed by the front camera in the photographing process includes three portions, i.e., acquiring, analyzing, and splicing the images. FIG. 18 schematically shows image processing provided according to the present specific embodiment.

In addition, if the cellphone is in a continuous preview mode, for example, video communication, the above steps S1 to S5 are completed once within one frame refresh cycle, and these steps are repeated continuously.

If the cellphone is in a photographing mode, in the current frame refresh cycle, a final image that has been processed is stored as the photographed image.

Embodiment 3

In the present embodiment, a photographing device is further provided. The photographing device is applied to the terminal in Embodiment 1 and is used to implement the above embodiments and preferred embodiments, and details that are provided foregoing will not be described any further. As used below, the term "module" may be a combination of software and/or hardware that can implement a predetermined function. Although the device described in the following embodiment is preferably implemented by software, it may also be contemplated that the device is possible to be implemented by hardware or a combination of software and hardware.

Figure 19:
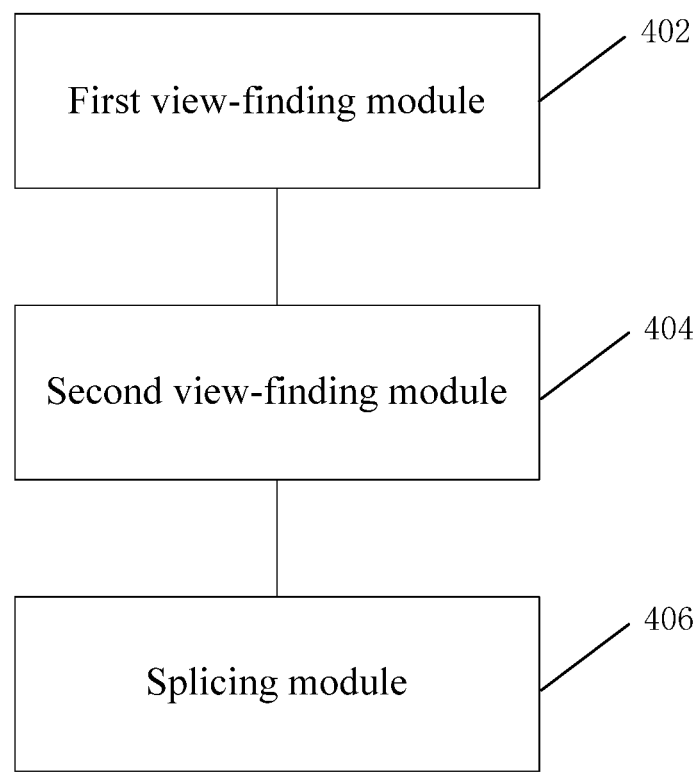
FIG. 19 is a block diagram showing a structure of a photographing device provided according to an embodiment of the present disclosure.

FIG. 19 shows a block diagram of a structure of the photographing device provided according to the present embodiment. As shown in FIG. 19, the device includes:
 a first view-finding module 402, which is configured to drive a camera to rotate to align with a first edge of a gap and find a view on a first photographing area through the gap;
 a second view-finding module 404, which is configured to drive the camera to rotate to align with a second edge of the gap opposite the first edge and find a view on a second photographing area through the gap; and
 a splicing module 406, which is configured to splice an image of view-finding on the first photographing area and an image of view-finding on the second photographing area so as to form a photographed view-finding image.

In the above embodiment, the camera is provided behind the gap formed by a display panel and a housing of the terminal. By driving the camera to rotate in a vertical direction of the gap and perform view-finding and photographing on different photographing areas, images of view-finding on different photographing areas are acquired by said photographing device; and by splicing said images of view-finding on different photographing areas, a photographed view-finding image is formed, so that photographing effect of a front camera can also be ensured while improving a screen-to-body ratio of the terminal. Therefore, the photographing device in the present embodiment can solve the problem in relevant technologies that a screen-to-body ratio of a terminal device cannot be improved due to an impact from arrangement of a front camera.

In an alternative embodiment, before driving the camera to rotate to the first edge of the gap by the first view-finding module 402, the following steps are included:

position information of the first edge and the second edge of the gap are collected when the camera is initialized; and coordinate axes are established according to the position information collected, herein, a direction in which the gap extends is set as an X axis, a direction perpendicular to the gap is set as a Y axis, a direction of view-finding is set as a Z axis.

In an alternative embodiment, after the coordinate axes are established according to the position information collected, the following steps are included:

a centerline position between the first edge and the second edge is calculated according to the coordinate axes established; and the camera is driven to rotate to the centerline position along the Y axis and perform focusing.

In an alternative embodiment, the step of splicing the image of view-finding on the first photographing area and the image of view-finding on the second photographing area to form the photographed view-finding image by the splicing module 406 includes that:

feature points in the image of view-finding on the first photographing area and the image of view-finding on the second photographing area are extracted respectively;

the image of view-finding on the first photographing area and the image of view-finding on the second photographing area are spliced according to the feature points extracted so as to form the photographed view-finding image; and a scale is selected for the photographed view-finding image according to a preset display scale.

In an alternative embodiment, after splicing the image of view-finding on the first photographing area and the image of view-finding on the second photographing area to form the photographed view-finding image by the splicing module 406, the following step is included:

the photographed view-finding image is stored as a photographed image.

In an alternative embodiment, at least one group of operations including view-finding on the first photographing area, view-finding on the second photographing area, and splicing the images of view-finding is completed by said photographing device within one refresh cycle of the camera.

It should be noted that, the above various modules may be implemented by software or hardware, and the latter may be realized in the following manner, but is not limited to this: the above modules are all located in the same processor; or the above various modules are respectively located in different processors.

Embodiment 4

The present disclosure further provides a storage medium configured to store a computer program which, when executed by a processor, causes the processor to perform steps of anyone of the above method embodiments.

In the present embodiment, said storage medium may be configured to store a computer program for executing the following steps:

S1, driving a camera to rotate to a first edge of a gap and perform view-finding on a first photographing area through the gap;

S2, driving the camera to rotate to a second edge of the gap opposite the first edge and perform view-finding on a second photographing area through the gap; and S3, splicing an image of view-finding on the first photographing area and an image of view-finding on the second photographing area to form a photographed view-finding image.

For specific examples in the present embodiment, reference can be made to examples described in the above embodiments and alternative embodiments, and details will not be described any further in the present embodiment.

In the present embodiment, said storage medium may include, but is not limited to, various mediums that can store the computer program: a USB flash disk, a read-only memory (ROM for short), a random access memory (RAM for short), a mobile hard disk drive, a magnetic disk, or an optical disk.

Embodiment 5

The present embodiment further provides an electronic device, including a memory and a processor. The memory stores a computer program therein. The processor is configured to execute the computer program so as to perform steps of anyone of the above method embodiments.

Said electronic device may also include a transmission device and an input-output device. The transmission device is coupled to said processor, and the input-output device is coupled to the processor.

In the present embodiment, said processor may be configured to execute the following steps by using the computer program:

S1, driving a camera to rotate to a first edge of a gap and perform view-finding on a first photographing area through the gap;

S2, driving the camera to rotate to a second edge of the gap opposite the first edge and perform view-finding on a second photographing area through the gap; and S3, splicing an image of view-finding on the first photographing area and an image of view-finding on the second photographing area to form a photographed view-finding image.

For specific examples in the present embodiment, reference can be made to examples described in the above embodiments and alternative embodiments, and details will not be described any further in the present embodiment.

Obviously, those skilled in the art should understand that the above various modules and various steps in the present disclosure may be implemented by a general computing device, and they may be integrated on a single computing device or distributed in a network formed by multiple computing devices. They may be implemented by program codes that can be executed by the computer device, so that they can be stored in a storing device so as to be executed by the computing device. Moreover, in some circumstances, the illustrated or described steps may be executed in an order different from the order herein; or they may be manufactured into various integrated circuit modules; or multiple modules or steps of them are manufactured into a single integrated circuit module. In this way, the present disclosure is not limited to any specific combination of hardware and software.

The above description only involves preferred embodiments of the present disclosure, and does not mean to limit the present disclosure. For those skilled in the art, the present disclosure may have various modifications and changes. Any modification, equivalent replacement, improvement made within the principle of the present disclosure shall all fall into the protection scope of the present disclosure.

What is claimed is:

1. A photographing method, which is applied to a terminal, wherein the terminal comprises: a housing, a display panel, a camera, and a driving assembly; the camera is provided inside the terminal, and is located behind a gap formed by the display panel and the housing; and the driving assembly is coupled to the camera for driving the camera to rotate; and the method comprises steps of:
   driving the camera to rotate to a first edge of the gap and perform view-finding on a first photographing area through the gap;
   driving the camera to rotate to a second edge of the gap opposite the first edge and perform view-finding on a second photographing area through the gap; and
   splicing an image of view-finding on the first photographing area and an image of view-finding on the second photographing area to form a photographed view-finding image;
   wherein at least one group of operations comprising an operation of view-finding on the first photographing area, an operation of view-finding on the second photographing area, and an operation of splicing the images of view-finding is completed within one refresh cycle of the camera.

2. The method according to claim 1, wherein before driving the camera to rotate to the first edge of the gap, the method further comprises:
   collecting position information of the first edge and the second edge of the gap when the camera is initialized; and
   establishing coordinate axes according to the position information collected, wherein a direction in which the gap extends is an X axis, a direction perpendicular to the gap is a Y axis, a direction of view-finding is a Z axis.

3. The method according to claim 2, wherein after establishing coordinate axes according to the position information collected, the method further comprises:
   calculating a centerline position between the first edge and the second edge according to the coordinate axes established; and
   driving the camera to move to the centerline position along the Y axis and perform the camera focusing.

4. The method according to claim 3, wherein after splicing an image of view-finding on the first photographing area and an image of view-finding on the second photographing area to form the photographed view-finding image, the method further comprises:
driving the camera to move to the centerline position along the Y axis to restore the camera.

5. The method according to claim 2, wherein collecting position information of the first edge and the second edge of the gap comprises:
   acquiring an image containing the first edge and the second edge of the gap;
   acquiring positions corresponding to the first edge and the second edge of the photographed gap by performing processing on the image.

6. The method according to claim 2, wherein a time instant when the camera is initialized comprises at least one time instant selected from a group consisting of:
   the time instant when the terminal enters into a power-on state from a power-off state, the time instant when the terminal switches to a working state from a sleep state and the time instant when the camera is powered on.

7. The method according to claim 1, wherein the scale is associated with a width of the gap in the vertical direction.

8. The method according to claim 1, wherein splicing the image of view-finding on the first photographing area and the image of view-finding on the second photographing area to form the photographed view-finding image comprises:
   extracting feature points in the image of view-finding on the first photographing area and the image of view-finding on the second photographing area, respectively;
   splicing the image of view-finding on the first photographing area and the image of view-finding on the second photographing area according to the feature points extracted so as to form the photographed view-finding image; and
   selecting a scale for the photographed view-finding image according to a preset display scale.

9. The method according to claim 1, wherein after splicing the image of view-finding on the first photographing area and the image of view-finding on the second photographing area to form the photographed view-finding image, the method further comprises:
   storing the photographed view-finding image as a photographed image.

10. A non-transitory computer readable storage medium, wherein the storage medium is configured to store a computer program which, when executed by a processor, causes the processor to perform the method according to claim 1.

11. An electronic device, comprising a memory and a processor, wherein the memory stores a computer program therein, and the processor is configured to execute the computer program so as to perform the method according to claim 1.

12. The terminal according to claim 1, wherein the driving assembly comprises:
   a rotation base plate, which is coupled to the camera;
   a driving component, which is coupled to the camera and configured to drive the camera to rotate along the rotation base plate.

13. The method according to claim 1, wherein the one refresh cycle is a refresh cycle of every frame of image in the display panel.

14. The method according to claim 1, wherein driving the camera to rotate to the first edge of the gap comprises:
   driving the camera to rotate to a position which is flush with a height of the first edge of the gap;
   wherein driving the camera to rotate to the second edge of the gap opposite the first edge comprises:
   driving the camera to rotate to a position which is flush with a height of the second edge of the gap.

15. A photographing method, which is applied to a terminal, wherein the terminal comprises: a housing, a display panel, a camera, and a driving assembly; the camera is provided inside the terminal, and is located behind a gap formed by the display panel and the housing; and the driving assembly is coupled to the camera for driving the camera to rotate; and the method comprises steps of:

driving the camera to rotate to a first edge of the gap and perform view-finding on a first photographing area through the gap;

driving the camera to rotate to a second edge of the gap opposite the first edge and perform view-finding on a second photographing area through the gap; and splicing an image of view-finding on the first photographing area and an image of view-finding on the second photographing area to form a photographed view-finding image;

wherein before driving the camera to rotate to the first edge of the gap, the method further comprises:

collecting position information of the first edge and the second edge of the gap when the camera is initialized;

establishing coordinate axes according to the position information collected, wherein a direction in which the gap extends is an X axis, a direction perpendicular to the gap is a Y axis, a direction of view-finding is a Z axis;

calculating a centerline position between the first edge and the second edge according to the coordinate axes established; and driving the camera to move to the centerline position along the Y axis and perform the camera focusing.

* * * * *